Oct. 1, 1963 J. PICKLES ETAL 3,105,668

MEMORY TYPE AUTOMATIC SEAT ADJUSTER

Original Filed June 4, 1958 5 Sheets-Sheet 1

INVENTORS
JOSEPH PICKLES
ORVILLE R. IDING
BY Whittemore Hulbert & Belknap
ATTORNEYS

MEMORY TYPE AUTOMATIC SEAT ADJUSTER

Original Filed June 4, 1958 5 Sheets-Sheet 2

INVENTORS
JOSEPH PICKLES
ORVILLE R. IDING
BY Whittemore
Hulbert & Belknap
ATTORNEYS

MEMORY TYPE AUTOMATIC SEAT ADJUSTER

Original Filed June 4, 1958 5 Sheets-Sheet 3

INVENTORS
JOSEPH PICKLES
BY ORVILLE R. IDING
Whittemore, Hulbert & Belknap ATTORNEYS INVENTORS
JOSEPH PICKLES
ORVILLE R. IDING
BY Whittemore Hulbert & Belknap
ATTORNEYS Oct. 1, 1963 J. PICKLES ETAL 3,105,668

MEMORY TYPE AUTOMATIC SEAT ADJUSTER

Original Filed June 4, 1958 5 Sheets-Sheet 5

INVENTORS
JOSEPH PICKLES
BY ORVILLE R. IDING
Whittemore, Hulbert & Belknap
ATTORNEYS 3,105,668

MEMORY TYPE AUTOMATIC SEAT ADJUSTER

Joseph Pickles, Dearborn, and Orville R. Iding, Detroit, Mich., assignors to Ferro Stamping Company, Detroit, Mich., a corporation of Michigan Continuation of application Ser. No. 739,723, June 4, 1958. This application Nov. 20, 1961, Ser. No. 155,529
11 Claims. (Cl. 248—394)

The present invention relates to a memory type automatic seat adjuster.

This application is a continuation application of applicants' copending application Serial No. 739,723, now abandoned.

It is an object of the present invention to provide an automatic seat adjuster for automotive vehicles capable of causing movement of the seat to a fully retracted and lowered position to facilitate entrance or exit of an occupant to or from the vehicle, in conjunction with control means including a single manually operated switch which when energized restores the seat to a predetermined intermediate adjusted position.

It is a further object of the present invention to provide a system as described in the preceding paragraph comprising manually operated switch means for restoring the vehicle seat to either of two intermediate positions.

It is a further object of the present invention to provide a memory control system for an automatically adjustable vehicle seat comprising means for establishing a plurality of independent intermediate adjusted positions, manually operated control means for shifting the seat to a fully retracted and lowered position, and manually operable switch means effective when energized to initiate return movement of the seat to a preselected intermediate adjusted position, and automatically operated means for terminating movement of the seat when it reaches predetermined intermediate adjusted position.

More specifically, it is an object of the present invention to provide a control system including a plurality of movable control members, means operable in response to movement of the seat to a predetermined intermediate adjusted position to effect a corresponding movement of one or more of said members, said members having yieldable elements thereon, switch actuators releasably engageable with said yieldable elements, and switches associated with said switch actuators having as a normal condition preferably a normally open condition, when the associated ones of said members are in predetermined adjusted position.

It is a further object of the present invention to provide a pair of yieldable elements on each of said members, a switch actuator associated with each of said yieldable elements, and a switch controlled by each of said switch actuators to enable establishing two intermediate adjusted seat positions.

It is a further object of the present invention to provide an automatic memory type seat control system including single manual control means for effecting movement of the seat to fully retracted and lowered position, and a pair of additional switch means selectively operable to effect re-adjustment of the seat from fully retracted and lowered position to either of two preset intermediate adjusted positions.

It is a further object of the present invention to provide seat control means including mechanism for setting control means to establish two separate intermediate adjusted seat positions, a pair of manually operable switches each effective when actuated to initiate operation of adjusting mechanism to move the seat from any other position to a selected one of said intermediate adjusted positions, and means for terminating operation of the seat adjusting mechanism when the seat reaches its predetermined adjusted position.

Other objects and features of the invention will become apparent as the description proceeds, especially when taken in conjunction with the accompanying drawings, illustrating preferred embodiments of the invention, wherein.

Figure 2:
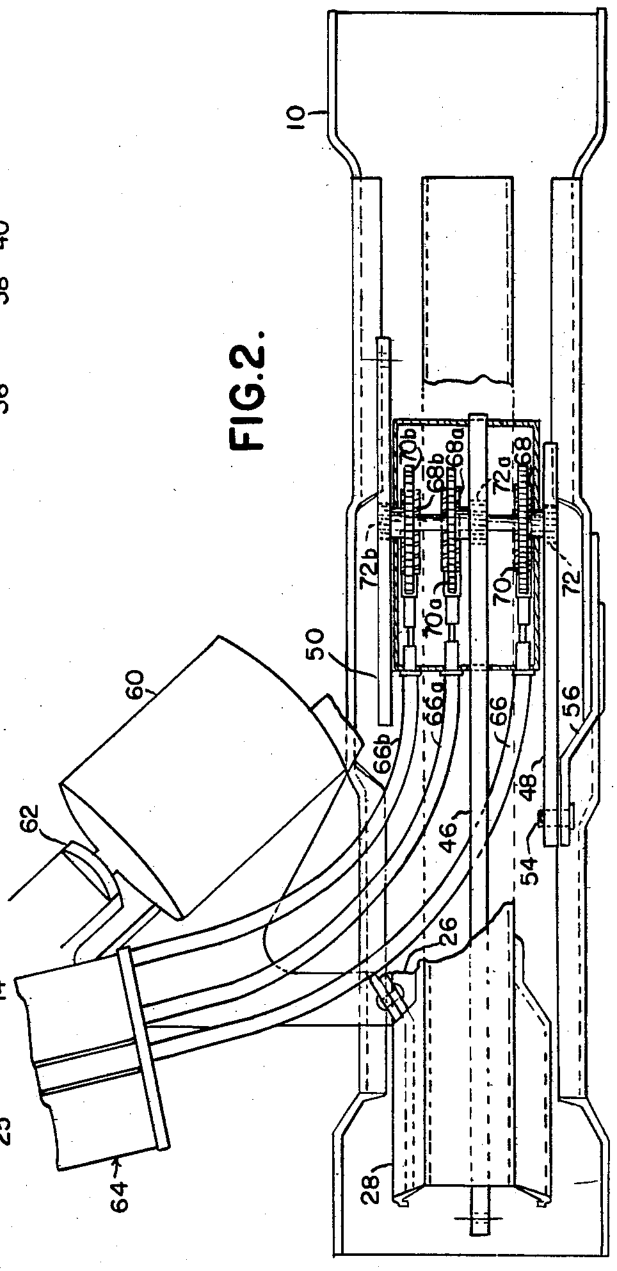
FIGURE 2 is a fragmentary partly broken away top view showing the connection from a motor through a clutch and gear box to worm and worm gears actuating rack driving pinions.
Figures 2A, 2B, 2C:
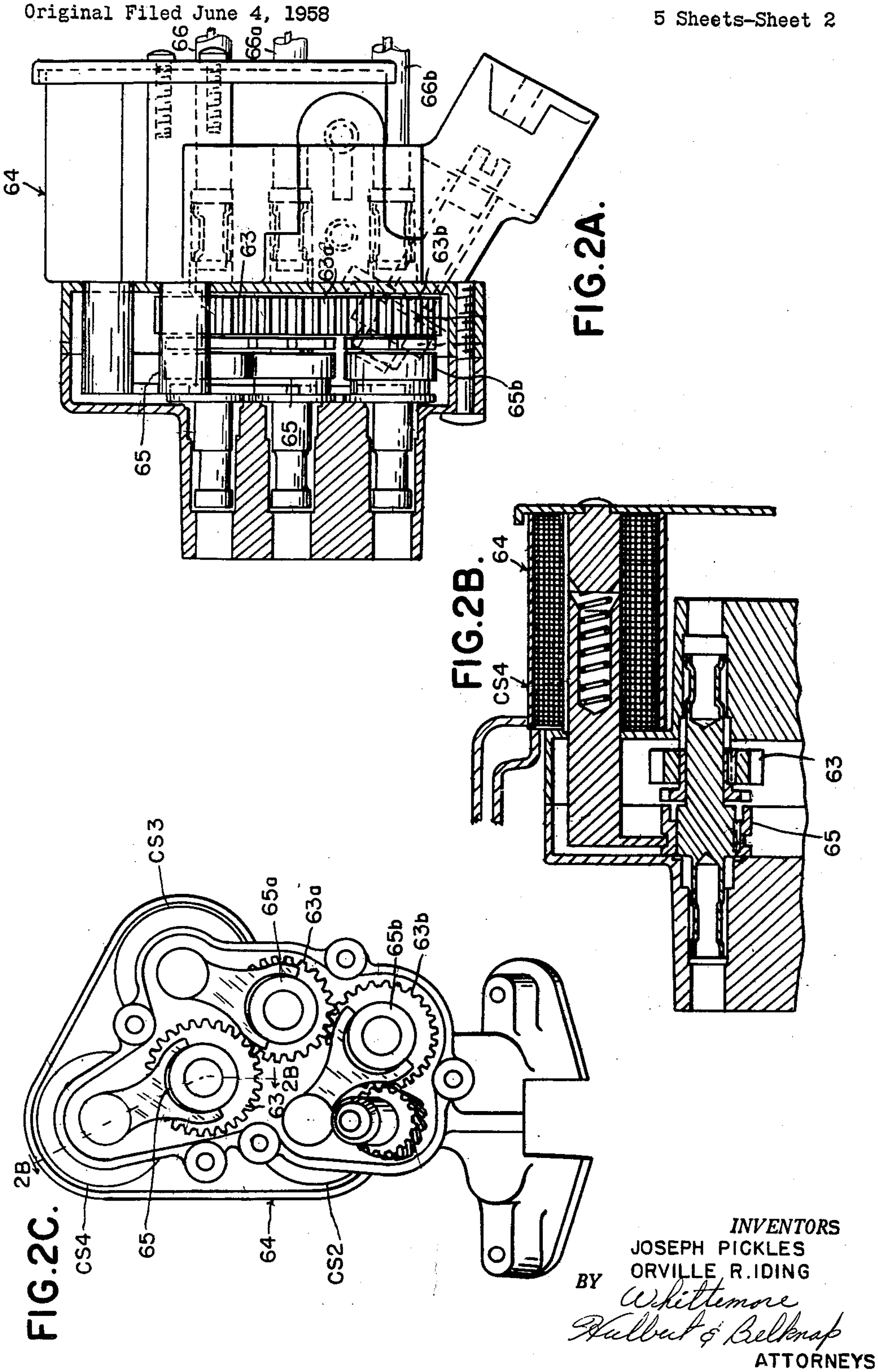

FIGURE 2–A is a top view partly broken away of the clutch and gear box shown in FIGURE 2.

FIGURE 2–B is a fragmentary section view of the clutch and gear box shown in FIGURE 2–A taken on line 2B—2B in FIGURE 2–C.

FIGURE 2–C is an end view of the clutch and gear box of FIGURE 2–A with the end cover removed.

Figures 3, 4, 5:
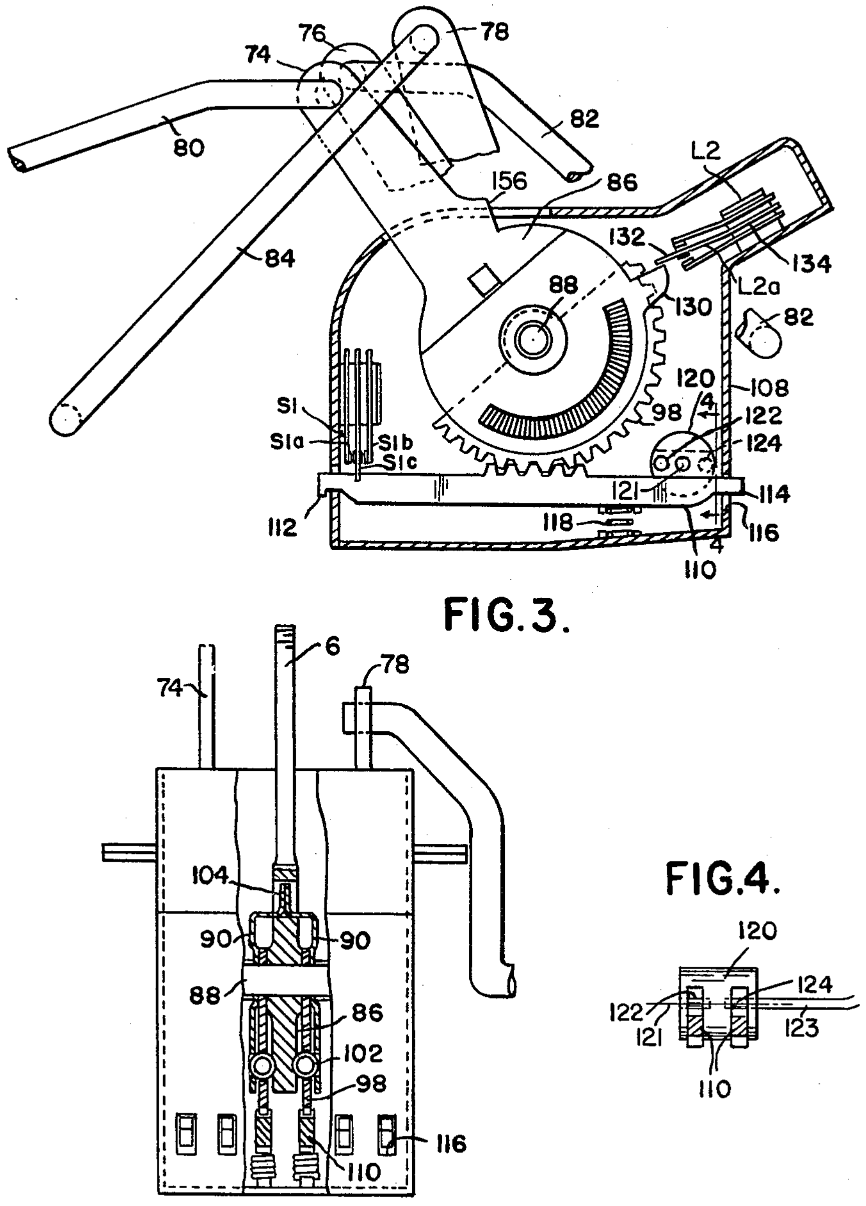

FIGURE 3 is a fragmentary elevational view showing a memory control device and its mechanical connections to the adjustable seat structure.

FIGURE 4 is a fragmentary vertical section on the line 4—4, FIGURE 3.

FIGURE 5 is a fragmentary plan view partly in section of the memory control device.

Figure 6:
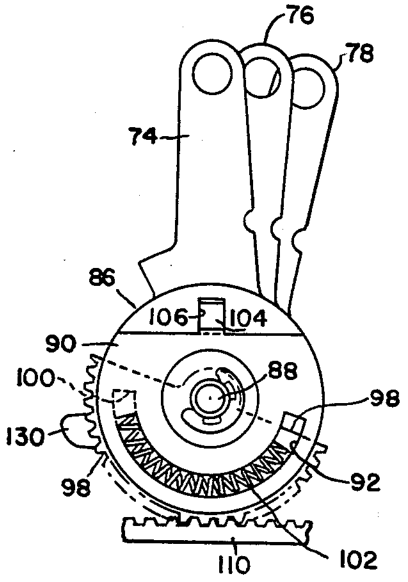

FIGURE 6 is a fragmentary perspective view of a part of the position setting device.

Figure 7:
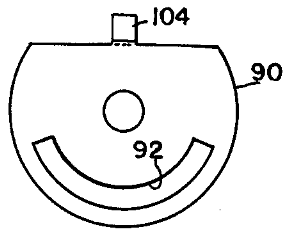

FIGURE 7 is an elevational view of a spring retainer plate used in the assembly shown in FIGURE 6.

Figure 8:
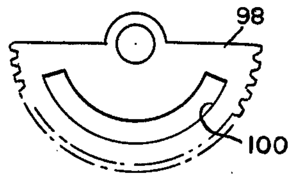

FIGURE 8 is an elevational view of a toothed sector employed in the assembly of FIGURE 6.

Figure 9:
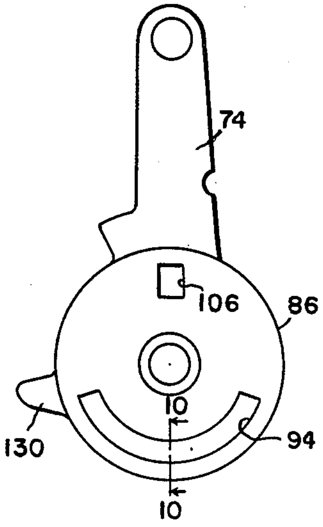

FIGURE 9 is an elevational view of a position responsive setting lever employed in the assembly of FIGURE 6.

Figure 10:
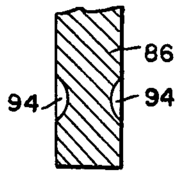

FIGURE 10 is a fragmentary section on the line 10—10, FIGURE 9.

Figure 11:
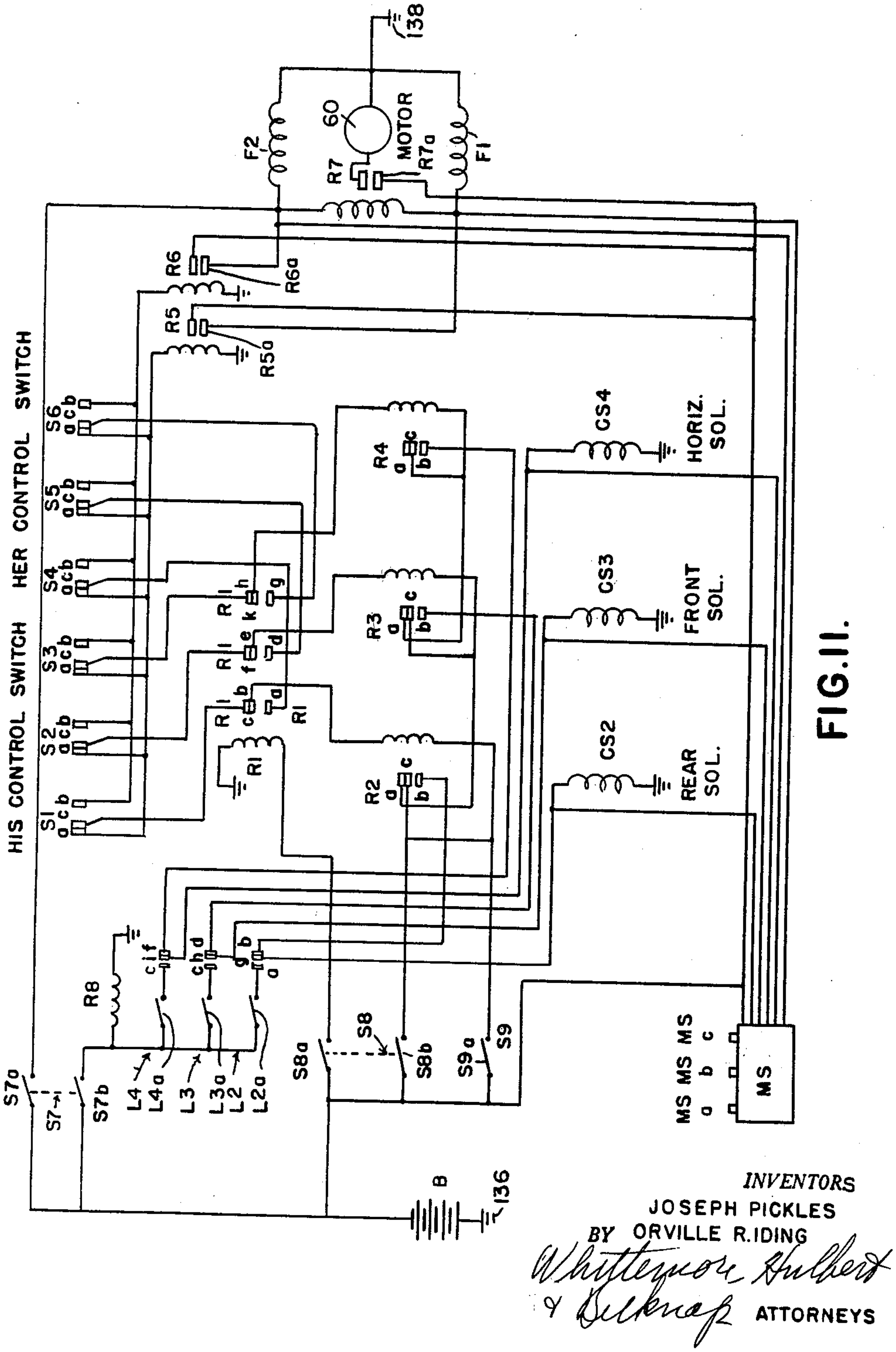

FIGURE 11 is a circuit diagram of a circuit suitable for employing the mechanism in effecting adjustment of the seat.

Referring now to the drawings, the memory control system for seat adjustment is illustrated as applied to a seat in which adjustment is effected by providing a lower slide movable fore and aft of the vehicle on fixed rails, and seat support frame elements are pivoted by levers at the front and rear ends to the slide. Obviously, fore and aft movement of the slide effects fore and aft adjustment of a seat mounted on the seat frame elements. The levers which interconnect the front and rear ends of the slide and seat frame elements are preferably bell type crank levers so connected as to cause rocking movement of the levers to produce generally up and down movement of the corresponding ends of the seat frame elements. With this arrangement it is of course apparent that by suitably actuating the levers at both the front and rear of the seat frame elements, the seat may be raised or lowered. If only one of such levers is actuated the seat is tilted either forwardly or rearwardly.

Figure 1:
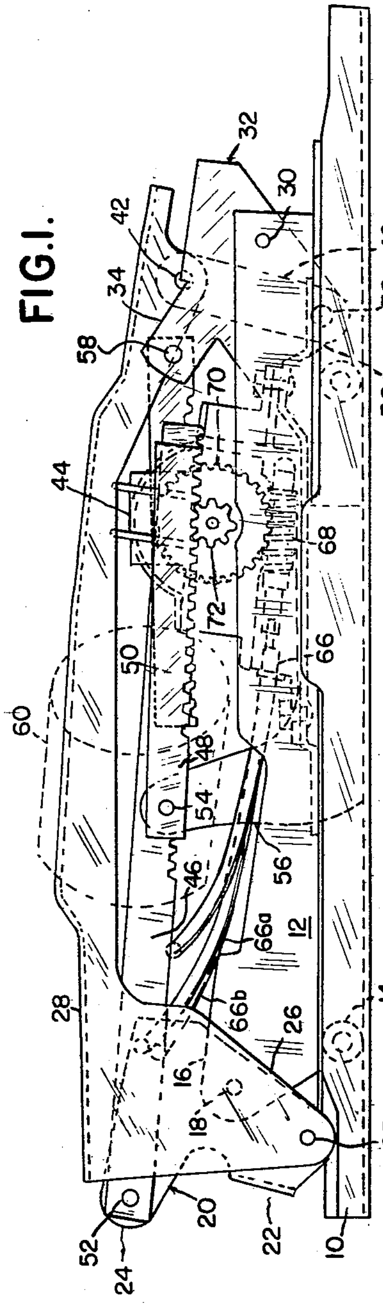
FIGURE 1 is a partial elevational view of the seat supporting and adjusting mechanism.

The foregoing seat adjusting mechanism is best illustrated in FIGURE 1 where one of the stationary rails or tracks is indicated at 10 adapted to be bolted or otherwise secured to the floor of the vehicle. It will of course be understood that a pair of such rails are provided located adjacent opposite ends of the seat and similarly, a pair of slides and seat frame elements are also provided.

Mounted for fore and aft adjustment on the stationary rail or track 10 is a slide 12, suitable rollers for providing for relatively free adjustment of the slide 12 being shown at 14. Adjacent the forward end of the slide 12 is an upstanding ear 16 affording a pivot mounting as indicated at 18 for a bell crank lever 20 having a lifting arm 22 and an actuating arm 24. Pivotally connected, as indicated at 25, to the lifting arm 22 of the bell crank lever 20 is a depending arm 26 of the seat frame element 28.

Similarly, a pivot mounting 30 is provided adjacent the rear end of the slide 12 to which is secured a bell crank lever 32 having an actuating arm 34 and a lift arm 36. The lift arm 36 has pivotally connected thereto, as indicated at 38, a lifting link 40 the upper end of which is pivotally connected, as indicated at 42, to the rear end of the seat frame element 28.

In order to effect power actuation of the seat to various adjusted positions, there is provided for movement with the slide 12 a drive unit 44 having therein three pinions 72, 72*a* and 72*b*, FIGURE 2 each of which is in mesh with an actuating rack. The three actuating racks are shown at 46, 48 and 50. The rack 46 at its forward end is pivotally connected as indicated at 52 to the actuating arm 24 of the front lift bell crank lever 20. The rack 48 is pivotally connected as indicated at 54 to a stationary post 56 which may be connected to the stationary rail or track member 10, or may be connected directly to the floor of the vehicle. The rack 50 is pivotally connected as indicated at 58 to the actuating arm 34 of the rear lift bell crank lever 32.

Each of the three pinions in mesh with the racks 46, 48 and 50 is separately actuated and in accordance with the present invention a single electric motor may be provided selectively coupled to one or more of the pinions by flexible drive shafts which are selectively clutched to the transmission means. One such single motor multiple drive unit is fully set forth in Patent No. 2,886,094 and will therefore be considered only briefly herein. Reference is made to the cited patent for a detailed consideration of the particular single motor multiple drive unit illustrated.

Referring now to FIGURES 2, 2–A, 2–B and 2–C there is shown a motor 60 having an output 62 connected to a gear and clutch box indicated generally at 64. Within the box 64 are a plurality of intermeshing gears 63, 63*a* and 63*b* driven from the motor 60 each of which is connected through a solenoid actuated clutch 65, 65*a* and 65*b* to a flexible drive cable 66, 66*a* and 66*b* leading to a worm 68, 68*a* and 68*b* in mesh with a worm gear 70, 70*a* and 70*b* keyed or otherwise secured to a pinion 72 which is in mesh with one of the racks 46, 48 or 50, as shown in FIGURE 2. It will be apparent that by operation of suitable electrical circuitry, the motor 60 may be energized and the appropriate one or more of the solenoids within the box 64 energized to connected the motor to the corresponding flexible drive cable which in turn effects actuation of a corresponding one of the racks.

Referring now to FIGURES 3–10 there is shown the memory control device which is adapted to be carried by and hence movable with the seat or a seat frame element 28. The memory device includes three setting levers 74, 76 and 78. The lever 74 is connected by a link 80 to the actuating arm 24 of the front lift bell crank lever 20. The lever 76 is connected by a link 82 to the actuating arm 34 of the rear lifting bell crank lever 32. The third lever 78 is connected by a link 84 to the stationary post 56 carried by the stationary rail or track 10 or a similar post fixedly mounted on the floor of the vehicle. The links 80, 82 and 84 are connected to the bell crank lever 20, actuating arm 34 and post 56 in the same manner as they are connected to levers 74, 76 and 78, as shown in FIGURES 3 and 5.

From the foregoing it will be seen that for each of the infinite number of intermediate positions which may be occupied by the adjustable vehicle seat, there will be corresponding positions of the setting levers 74, 76 and 78.

Referring more particularly to FIGURES 6–10, each of the levers 74, 76 and 78 extends from generally cylindrical discs 86 provided with central openings by means of which they are mounted for rotation on a tubular support or bearing member 88. Rigidly affixed to opposite sides of the discs 86 are plates 90 provided with elongated arcuate slots 92. As best seen in FIGURE 9, each of the discs 86 is provided with similar arcuate recesses 94 which are of arcuate cross-section as best seen in FIGURE 10.

Mounted for rotation with respect to discs 86 on bearing member 88 on opposite sides of each of the discs 86 and between the discs and the adjacent plates 90 are a pair of toothed sectors 98. Each of the toothed sectors, as best illustrated in FIGURE 8, is provided with an elongated arcuate slot 100. Received in the slot 100 in the toothed sectors 98 are coil compression springs 102. The compression springs extend partly into the arcuate slots 92 in the plates 90 and are partly received in the arcuate recesses 94 at the opposite sides of the discs 86. With the parts in the position illustrated in FIGURE 6 the ends of the arcuate slots 100 are not in alignment with the ends of the slots 92 and arcuate recesses 94 which are in alignment. It will be apparent that in this condition the spring 102 is under appreciable compression and the sectors are spring biased to return to a position in which the ends of the arcuate slots 100 therein are in alignment with the ends of the recesses 94 and slots 92. However, relative angular movement between the discs 86 and the associated arm 74, 76 or 78 which are fixed in relation to either or both of the toothed sectors associated therewith is permitted. It may be mentioned at this time that the plates 90 which are located at opposite sides of each of the discs 86 are connected thereto by a finger 104 which is received in a recessed seat 106, the seats being located at opposite sides of each of the discs 86 and each pair of seats together forming an aperture through the individual discs 86 as shown in FIGURES 6 and 9.

The memory device comprises a housing 108 in which are located six switch actuating rack bars 110, one being associated with each of the toothed sectors. The rack bars have ears 112 at one end which form a loose pivot support and permits limited longitudinal movement thereof. The opposite end of each of the rack bars, as indicated at 114, is vertically movable in a slot 116 in the housing 108. Suitable spring means such for example as indicated at 118 biases the several rack bars upwardly. Mechanically operable means indicated at 120 are provided for depressing one rack bar associated with each of the three discs and lever devices. As indicated, the actuator comprises a slotted cylinder mounted for rotation about its axis 121 and having abutments 122 engageable with one of the rack bars associated with three of the levers, and abutments 124 associated with the remaining rack bars and levers. A section of the cylinder 120 is shown in FIGURE 4. It will be understood that three such sections in axial alignment are provided in connection with the three sets of rack bars associated with the three levers 74, 76 and 78. The three sections of cylinder 120 are rotatable about the common axis 121 by any convenient means such as a drive cable 123 attached at one end to the end section of cylinder 120 and at the other end to suitable drive means (not shown).

In the position illustrated in FIGURE 3 each of the rack bars 110 is permitted limited longitudinal movement. Provided in the housing 108 in association with each of the rack bars 110 are switches S1, S2, S3, S4, S5 and S6. In FIGURE 3 it is assumed that the switch is S1 and it comprises contacts S1*a* and S1*b*, together with an intermediate movable contact S1*c* carried by a spring arm connected to the rack bar 110. With the rack bar in the position illustrated in FIGURE 3 it will be noted that the intermediate contact S1*c* of the switch S1 is spaced from the two contacts S1*a* and S1*b*. However, limited movement of the rack in either direction will close the center contact with either of the contacts S1*a* or S1*b*, at which time the sector, lever and spring may be as seen in FIGURE 6.

If it is assumed that the rack bar 110 is associated with a sector 98 associated with the lever 74, it will be apparent that operation of the rack 46 driven by worm gear 68*a* which produces rocking movement of the lever 20 in either direction from the illustrated position will initially cause longitudinal movement of the rack bar 110 so as to close one of the switch contacts S1*a*, S1*c*, or S1*b*, S1*c*. Since the contact S1*c* is carried by a flexible arm, the contacts will remain closed while the rack bar 110 undergoes its relatively limited longitudinal movement. Thereafter, continued movement of the lever 20 will result in continued angular movement of the lever arm 74. At this time the rack bar 110 is prevented from moving and accordingly the spring 102 becomes compressed as the end of the recess 94 in the disc 86 and the end of the slot 92 in the plate 90 carry one end of the spring away from one end of the slot 100 in the toothed sector 98. So long as the seat remains out of adjustment the spring will remain compressed and the switch S1 will remain closed in one direction or the other. However, when the seat is brought back so that the lever 20 occupies the position which it initially occupied, the intermediate switch contact S1*c* resumes its neutral intermediate position as shown in FIGURE 3.

Means are provided for operating the setting levers 74, 76 and 78 to establish a memory control for two intermediate seat positions which may for convenience be designated "His" and "Hers."

It will be understood that the memory system disclosed herein is associated with a multiple position manually controlled seat adjusting mechanism of the usual type so that the operator or two operators of the vehicle may initially adjust the front seat to the position which best suits them. During such adjustment the rack bars 110 will be in the upper position shown in FIGURE 3 and accordingly, movement of the seat to the adjusted position will effect movement of the rack bars 110 out of the neutral position and into a limiting position as determined by abutments thereon engageable with adjacent portions of the housing 108. The longitudinal movement permitted the rack bars is relatively slight. After the bars have moved to a limiting position, further movement of the seat will have the effect of compressing the spring 102 as a result of movement of one end thereof by the ends of the recess 94 and slot 92. After the seat has been brought into a preselected position, and assuming that the adjustment has been accomplished by the individual who is to use the so-called "His" control switch, then the mechanically operable means 120 is rotated in the appropriate direction to depress one of the rack bars associated with each of the setting levers 74, 76 or 78. When the rack bars are dropped to a position in which they release the toothed sectors 98, the sectors immediately return to an intermediate or center position with respect to the disc 86 of the associated setting lever. The manually operated mechanism 120 is then released and the racks move upwardly into meshed engagement with the toothed sectors. At this time the switches controlled by the three "His" rack bars are open. These switches will be open only when the seat is in the "His" position and will be closed in one direction or the other at any time when the seat is out of this adjusted position. It may also be noted that when the seat is in the "His" position all of the "Hers" switches will be closed in one direction or the other depending on the relative position in each of the three adjustments of the seat chosen for the "Hers" position.

Inasmuch as the present invention has as a primary object to facilitate movement of the seat to a fully lowered and retracted position followed by a restoring movement to a predetermined intermediate operating position, limit switches are provided in association with the memory control device operable to terminate seat movement when the seat has reached its fully lowered and fully retracted position. For this purpose a plurality of single pole, single throw, normally closed limit switches L2, L3 and L4 are provided.

Each of the discs 86 includes a radial projection 130 which is engageable with a projection 132 on the flexible arm 134 which carries a movable contact L2*a*, L3*a*, or L4*a*. The projections 130 are so located that as each of the setting levers 74, 76 and 78 reaches a position corresponding to the fully lowered and retracted position of the seat, its projection 130 shifts the movable contact of the associated limit switch out of engagement with its stationary contact.

Referring now to FIGURE 11 there is shown the electrical circuit for effecting movement of the seat from any intermediate position to a fully lowered and retracted position, and for returning the seat to either of two preselected intermediate positions. The circuit in general is connected to the usual manual control circuit effected by a manual switch MS having three buttons MS*a*, MS*b* and MS*c* which are adapted when depressed to energize the motor 60 in either forward or reverse direction and to connect the appropriate one of the clutch actuating solenoids CS2, CS3 and CS4. The memory control device comprises a set of three control switches S1, S2 and S3 which are a part of "His" control circuit, and three additional switches S4, S5 and S6 which are a part of "Hers" control circuit. The switches S1 through S6 include the intermediate movable contacts S1*c*, S2*c*, S3*c*, S4*c*, S5*c* and S6*c*, normally spaced from the relatively fixed pairs of contacts S1*a*, S1*b*, and S2*a*, S2*b*, etc. These are the switches which are controlled by movement of the several rack bars 110. In addition, the circuit includes a double pole, single throw retracting switch S7 having contacts S7*a* and S7*b*; a "Hers" manual double pole, single throw switch S8 having contacts S8*a* and S8*b*; and a "His" single pole, single throw switch S9 having the movable contact S9*a*. Included in the circuit is a relay R1 adapted to be controlled by the contact S8*a* of the switch S8, this relay having a first pair of fixed contacts R1*a* and R1*b* between which is a movable contact R1*c* normally engaged with the contact R1*b*; a second pair of stationary contacts R1*d* and R1*e* between which is a movable contact R1*f* normally in engagement with the stationary contact R1*e*; and a third pair of stationary contacts R1*g* and R1*h* between which is a movable contact R1*k* normally in engagement with the stationary contact R1*h*.

Sequencing relays R2, R3 and R4 are provided for effecting a sequencing control of seat movements as will later appear. The coils of the relays R2, R3 and R4 are sequentially energized in a predetermined program. The coil of the relay R2 is in series with the contact S9*a* of the "His" switch S9, the circuit being completed through this coil to the center movable contact R1*c*. Relay R2 has a pair of stationary contacts R2*a* and R2*b* between which is located a movable contact R2*c* normally in engagement with stationary contact R2*a*. Movable contact R2*c* is connected to the contact S8*b* of the "Hers" switch S8 and also to the movable contact S9*a* of the "His" switch S9. Contact R2*a* is connected through the coil of the relay R3 to the center movable contact R1*f* of the relay R1. The relay R3 is provided with a pair of fixed contacts R3*a* and R3*b* between which is a movable contact R3*c* normally in engagement with the fixed contact R3*a*. The movable contact R3*c* is connected to the stationary contact R2*a*. The stationary contact R3*a* is connected through the coil of the relay R4 to the movable contact R1*k*. Relay R4 is provided with a pair of stationary contacts R4*a* and R4*b* between which is located a movable contact R4*c* normally in engagement with the stationary contact R4*a*. Stationary contact R4*a* is not connected.

The control circuit for the motor 60 includes field windings F1 and F2 to which circuits may be completed by energization of relays R5 and R6 respectively, these relays including contacts R5*a* and R6*a* respectively. In addition, the motor control circuit includes a relay R7 having a high resistance coil and including normally open contacts R7*a* adapted to complete a circuit to the armature of the motor. The arrangement is such that the relay R7 is energized when either of the field windings F1 or F2 is energized. The circuit through the coil of the relay R7 is completed through one or the other of the field windings F1 or F2, but the current therethrough is negligible due to the high resistance of the coil of the relay R7.

The circuit includes a relay R8 having pairs of stationary contacts R8*a*, R8*b*, and R8*c*, R8*d*, and R8*e*, R8*f*. Intermediate stationary contacts R8*a* and R8*b* is a movable contact R8*g* normally in engagement with stationary contact R8*b*. Intermediate stationary contacts R8*c* and R8*d* is a movable contact R8*h* normally in engagement with stationary contact R8*d*. Intermediate stationary contacts R8*e* and R8*f* is a movable contact R8*k* normally in engagement with stationary contact R8*f*. The coil of relay R8 is in series with the contact S7*b* of the retracting switch S7 and a circuit is completed through the coil to ground as indicated at 140 when the retracting switch S7 is closed.

The circuit includes normally closed single pole, single throw limit switches L2, L3 and L4 including the movable contacts L2*a*, L3*a* and L4*a* adapted to be moved to a circuit opening position by the asosciated radial projection 130 of the appropriate setting lever 74, 76 or 78. The limit switches L2, L3 and L4 are respectively in series between contact S7*b* of the retracting switch S7 and the contacts R8*a*, R8*c* and R8*e* respectively of the relay R8.

While the operation of the system is probably apparent from the foregoing, a typical operation will be traced. In this operation it is assumed that the seat is in its fully retracted and lowered position. Accordingly, at this time limit switches L2, L3 and L4 are open, and it is further assumed that the memory control device has been so set that all of the switches S1 through S6 are closed in one direction or another as indicated in the diagram. At this time the "His" switch S9 is closed. As illustrated in the wiring diagram, it will be necessary for the operator to hold this switch closed until the seat reaches its intermediate adjusted "His" position. It will be understood however, that if desired a relay and holding circuit may be associated with the "His" switch S9 in a conventional manner so that only momentary closure by the operator of the "His" switch S9 is required, the circuit being held in until completion of the seat adjustment, at which time all three of the switches S1, S2 and S3 are open.

Closure of "His" switch S9 completes a circuit from the battery B through the coil of the relay R2, through contacts R1*b* and R1*c*, and through contacts S1*a* and S1*c* through the coil of relay R5 to ground. This closes the contact R5*a* establishing a circuit from the battery through field windings F1 and the parallel circuit through the relay R7 is energized, thus closing contact R7*a* and establishing a circuit through the armature of the motor.

Energization of relay R2 shifts the movable contact R2*c* into engagement with stationary contact R2*b*. A circuit is thus completed from the battery B through contacts S9*a*, R2*c*, R2*b*, R8*b*, R8*g*, through the windings of the clutch control solenoid CS2 to ground. Thus, the motor is energized in the appropriate direction to bring about a lifting movement of the rear lever 32 when the rack connected thereto is actuated by the pinion connected through the flexible drive connection 66 to the motor 60. The clutch solenoids CS3 and CS4 at this time are not actuated since the sequencing relays R3 and R4 have not been energized.

After appropriate adjustment of the rear lift lever 32 the associated setting lever reaches the preset position at which time the switch S1 opens. This has the effect of breaking the circuit through the relay R2 and also of course of breaking the circuit to the relay R5. De-energization of relay R2 causes the movable contact R2*c* to engage fixed contact R2*a* and a circuit is then completed through the "His" switch S9, contacts R2*c*, R2*a*, through the windings of the relay R3, contacts R1*e* and R1*f*, and through the contacts S2*c* and S2*e* of the "His" control switch S2 re-establishing a circuit through the windings of the relay R5 and again energizing the motor 60 in the appropriate direction. At this time the circuit through the rear clutch control solenoid CS2 is broken by movement of the movable contact R2*c*. Energization of relay R3 shifts the movable contact R3*c* downwardly into engagement with the contact R3*b* and a circuit is established from the battery through the "His" switch S9 through contact R2*c*, R2*a*, R3*c*, R3*b*, R8*d*, R8*h*, and through the winding of the front clutch control solenoid CS3 to ground. This results in actuation of the front lift lever 20 until switch S2 opens, at which time sequencing relay R3 is de-energized, relay R4 is energized, and appropriate adjustment of the seat in a fore and aft direction occurs, until finally the switch S3 opens, thus terminating the re-adjustment of the seat.

It may be mentioned that the "Hers" control switch S8 includes a contact S8*a* which energizes the "Hers" relay R1 which has the effect of shifting the movable contacts R1*c*, R1*f* and R1*h* thereof from the position shown into engagement with the stationary contacts R1*a*, R1*d* and R1*g* respectively. With this difference the operation of the "Hers" re-adjustment circuit is the same as "His."

From the foregoing it will be observed that the seat may be adjusted through the manual control switch MS into either of two desired positions at which time the setting levers will have biased the normally spring centered toothed sectors 98 so that when the three "His" or "Hers" rack bars are depressed, the sectors will be spring urged into a predetermined position. Release of the rack bar depressing means permits the rack bars to engage the toothed sectors in the adjusted position.

With the seat in either of the two preset intermediate positions, or in fact any intermediate position, closure of the retracting switch S7 results in a sequenced movement of the seat to fully retracted and lowered position, this adjustment continuing until operation of the motor 60 is terminated by opening of the last of the three limit switches L2, L3 and L4. Upon re-entering the vehicle the operator may depress either the "His" or "Hers" switch S9 or S8 and the seat will be automatically re-adjusted to the predetermined position.

It will also be observed that if the seat is in the "His" position for example, as may occur if an occupant gets out of the vehicle without moving the seat to its fully retracted position, it is possible to re-adjust the seat from the "His" position to the "Hers" position without requiring it to move through the fully retracted and lowered position.

The drawings and the foregoing specification constitute a description of the improved memory type automatic seat adjuster in such full, clear, concise and exact terms as to enable any person skilled in the art to practice the invention, the scope of which is indicated by the appended claims.

What we claim as our invention is:

1. A memory seat adjustment system for a vehicle seat of the type having mechanism for effecting vertical seat adjustment and horizontal seat adjustment, reversible electric motor means for operating said mechanism, and manually operable switch means for effecting independent and selective vertical and horizontal adjustment, said memory system comprising a memory device operatively associated with the vehicle seat and including a set of normally closed switches and means operatively associated with said switches for opening said set of switches when the seat reaches fully down and rearward retracted position, a set of normally open switches, means for closing said normally open set of switches except when the vehicle seat is in a predetermined vertical and horizontal intermediate position, a circuit including said memory device and in addition a single manual retraction switch and a position restoring switch, said circuit being effective to operate said motor means to retract the vehicle seat down and rearward until opening of said set of normally closed switches upon closure of said retraction switch, and effective to operate said motor means to move the vehicle seat vertically and horizontally directly to the predetermined intermediate position upon closure of said restoring switch from any vertical and horizontal intermediate position thereof, at which predetermined position said set of normally open switches is opened.

2. A system as defined in claim 1 in which said circuit comprises sequence means effective to require completion of one phase of adjustment before initiation of another.

3. A system as defined in claim 1 in which said circuit comprises means for initiating simultaneously all phases of adjustment requiring motor rotation in one direction, and means for reversing motor rotation thereafter if required to effect the necessary seat adjustment.

4. A memory control system for adjustable vehicle seats comprising motor means, seat adjusting mechanism, means connecting said motor and mechanism, a memory device comprising a first member operably associated with a seat to be adjusted and movable therewith into a plurality of positions corresponding to a corresponding plurality of adjusted seat positions, a second member connected to said first member for movement therewith and relative thereto, resilient means connecting said first and second members, a motor control member having an intermediate neutral position and movable in either direction therefrom, means limiting movement of said control member to movements of small amplitude from its neutral position, means for coupling said second member to said control member in any selected position of said first member with said control member in its neutral position when so coupled, a first manual control member for said motor means operable when actuated to effect movement of said seat to fully retracted position, means for terminating movement of said seat upon reaching said retracted position, a second single manual control member operable to effect return of said seat directly to the position it occupied when said second member and said control member were coupled from any intermediate position of the seat, and means for thereupon terminating movement of said seat.

5. A system as described in claim 4 in which said first member comprises a pivoted setting lever, said second member comprises a toothed sector pivotally connected thereto, and said control member comprises a toothed member meshed with said sector.

6. A system as described in claim 5 in which said toothed member comprises a rack.

7. A system as described in claim 4 in which said motor means comprises an electric motor, and said manual control members and the means for terminating seat movement comprise switches.

8. A memory seat adjustment system for a vehicle seat comprising mechanism for effecting horizontal and vertical seat adjustment, motor means for operating said mechanism, a memory device operatively associated with the vehicle seat and including a set of normally open switches, and means for closing said normally open set of switches except when the vehicle seat is in a predetermined intermediate position, and a circuit including said normally open switches and a position restoring switch effective to operate said motor means to move the vehicle seat horizontally and vertically directly to said predetermined intermediate position from any intermediate position thereof upon closure of said restoring switch, at which position said set of normally open switches is opened.

9. A memory control system for adjusting vehicle seats comprising motor means, seat adjusting mechanism, means connecting said motor and mechanism, a memory device comprising a pivoted lever operably associated with a seat to be adjusted and movable therewith into a plurality of positions corresponding to a corresponding plurality of adjusted seat positions, a toothed sector connected to said lever for movement therewith and relative thereto, resilient means for connecting said lever and sector, a rack meshed with said sector having an intermediate neutral position and movable in either direction therefrom, means limiting movement of said rack to movements of small amplitude from its neutral position, means for coupling said toothed sector to said rack in any selected position of said pivoted lever with said rack in its neutral position when so coupled, a first manual control member for said motor means operable when actuated to effect movement of said seat to fully retracted position, means for terminating movement of said seat upon reaching said retracted position, a second single manual control member operable to effect return of said seat directly to the position occupied when said sector and said rack were coupled, and means for thereupon terminating movement of said seat.

10. Structure as claimed in claim 9 and further including circuit means responsive to said second manual control member operable to effect return of said seat to the position it occupied when said sector and rack were coupled through sequential movement thereof in distinct directions.

11. Structure as claimed in claim 9 and further including circuit means responsive to the second manual control member for effecting return of said seat to the position it occupied when said sector and rack were coupled through first simultaneously moving the seat in all directions requiring a particular direction of rotation of said motor means and thereafter reversing the direction of rotation of the motor means if required to complete movement of said seat to the position it occupied when the sector and rack were coupled.

References Cited in the file of this patent

UNITED STATES PATENTS

| | | |
|---|---|---|
| 2,720,619 | James | Oct. 11, 1955 |
| 2,805,702 | Appleton | Sept. 10, 1957 |
| 2,823,949 | Williams et al. | Feb. 18, 1958 |
| 2,827,105 | Brundage | Mar. 18, 1958 |
| 2,829,002 | Leavengood et al. | Apr. 1, 1958 |
| 2,886,094 | Pickles | May 12, 1959 |